(12) United States Patent
Moore et al.

(10) Patent No.: US 10,804,762 B2
(45) Date of Patent: Oct. 13, 2020

(54) ELECTRIC MACHINE

(71) Applicant: General Electric Company, Schenectady, NY (US)

(72) Inventors: Nicholas Taylor Moore, Cincinnati, OH (US); Daniel Alan Niergarth, Norwood, OH (US); Paul Robert Gemin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 168 days.

(21) Appl. No.: 15/889,619

(22) Filed: Feb. 6, 2018

(65) Prior Publication Data
US 2019/0245405 A1   Aug. 8, 2019

(51) Int. Cl.
| | |
|---|---|
| *H02K 3/42* | (2006.01) |
| *H02K 1/27* | (2006.01) |
| *H02K 1/16* | (2006.01) |
| *H02K 9/22* | (2006.01) |
| *H02K 21/02* | (2006.01) |

(52) U.S. Cl.
CPC .............. *H02K 3/42* (2013.01); *H02K 1/165* (2013.01); *H02K 1/2793* (2013.01); *H02K 9/22* (2013.01); *H02K 21/026* (2013.01); *H02K 2201/03* (2013.01)

(58) Field of Classification Search
CPC ........ H02K 3/42; H02K 1/165; H02K 1/2793; H02K 9/22; H02K 21/026; H02K 21/24; H02K 2201/03; H02K 1/182
See application file for complete search history.

(56) References Cited

U.S. PATENT DOCUMENTS

| | | | | |
|---|---|---|---|---|
| 3,304,450 | A | * | 2/1967 | Bosco, Jr. .............. H02K 19/24 310/126 |
| 6,304,015 | B1 | * | 10/2001 | Filatov ................ F16C 32/0436 310/90.5 |
| 6,455,975 | B1 | | 9/2002 | Raad et al. |
| 7,847,443 | B2 | * | 12/2010 | Farnia .................... H02K 1/148 310/209 |
| 2005/0067917 | A1 | | 3/2005 | Kastinger et al. |
| 2010/0264768 | A1 | | 10/2010 | Alfermann et al. |
| 2013/0293037 | A1 | | 11/2013 | Sakamoto et al. |

FOREIGN PATENT DOCUMENTS

JP         2013162677    *   8/2013

* cited by examiner

*Primary Examiner* — Burton S Mullins
(74) *Attorney, Agent, or Firm* — Dority & Manning, P.A.

(57) ABSTRACT

An axial flux electric machine includes a rotor assembly rotatable about an axis, and a stator assembly. The stator assembly includes a stator face defining an air gap along an axial direction with the rotor assembly, the stator assembly further including a yoke, the yoke including a back surface, the back surface defining an inwardly sloped angle with the radial direction greater than two degrees.

20 Claims, 6 Drawing Sheets

ELECTRIC MACHINE

FIELD

The present subject matter relates generally to an electric machine having a stator designed to reduce eddy currents.

BACKGROUND

Electric machines, e.g., electric motors and generators, are used in a variety of industries to convert electrical energy to mechanical energy, and vice versa, for useful purposes. For example electric machines are used in the automotive, aviation, maritime, and other industries to operate aircrafts, helicopters, automobiles, boats, submarines, trains, and/or any other suitable vehicles.

For certain applications, it is beneficial to utilize electric machines with rotor magnets configured to generate a magnetic field that extends substantially along an axial direction of the electric machine between a rotor assembly and stator assembly of the electric machine. Such electric machines are generally referred to as "axial flux" electric machines. In axial flux electric machines, the stator assembly includes a plurality of stator teeth arranged along a circumferential direction of the electric machine, and similarly, the rotor assembly may include a plurality of rotor magnets arranged along the circumferential direction of the electric machine.

Also with such a configuration, the stator teeth and rotor magnets may each have a wedge shape, such that they each have a greater arc length at a radially outer end as compared to at a radially inner end. Such a configuration accordingly increases the total magnetic flux per available, gap surface area. A wedge maximizes the magnet area/total gap area resulting in increased torque for a given annular height at the cost of increased eddy current loss. More specifically, such a configuration may result in greater magnetic flux densities at the radially outer end of the stator assembly as compared to at the radially inner end. Such may result in undesirable eddy current losses, reducing an efficiency of the electric machine, and further increasing a temperature of the stator assembly.

Accordingly, an electric machine having a stator assembly configured to minimize eddy currents would be useful. More specifically, an axial flux electric machine having a stator assembly configured to minimize the eddy currents would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, an axial flux electric machine defining an axis, an axial direction, a circumferential direction, and a radial direction is provided. The electric machine includes a rotor assembly rotatable about the axis, and a stator assembly. The stator assembly includes a stator face defining an air gap along the axial direction with the rotor assembly, the stator assembly further including a yoke, the yoke including a back surface, the back surface defining an inwardly sloped angle with the radial direction greater than two degrees.

In certain exemplary embodiments, the inwardly sloped angle is greater than about three degrees and less than about forty degrees.

In certain exemplary embodiments the yoke of the stator assembly defines a substantially consistent magnetic flux density along the radial direction.

In certain exemplary embodiments the yoke defines an inner radius along the radial direction and an outer radius along the radial direction, wherein the yoke further defines a first thickness at the inner radius along the axial direction and a second thickness at the outer radius along the axial direction, wherein the second thickness is at least about ten percent greater than the first thickness.

In certain exemplary embodiments the yoke defines an inner radius along the radial direction and an outer radius along the radial direction, wherein the yoke defines a substantially consistent first thickness at the inner radius along the circumferential direction, and wherein the yoke defines a substantially consistent second thickness at the outer radius along the circumferential direction.

In certain exemplary embodiments the yoke defines an inner radius along the radial direction and an outer radius along the radial direction, wherein the back surface of the yoke extends in a substantially straight direction from the inner radius to the outer radius.

In certain exemplary embodiments the stator assembly and rotor assembly each define a pole count, and wherein the pole count of each of the stator assembly and the rotor assembly is less than or equal to 24.

In certain exemplary embodiments the stator assembly includes a plurality of stator teeth coupled to, or formed integrally with, the yoke, wherein each stator tooth defines an outer length along the circumferential direction and an inner length along the circumferential direction, and wherein the outer length is at least about ten percent greater than the inner length.

In certain exemplary embodiments the rotor assembly includes a plurality of magnets, wherein each magnet defines an outer length along the circumferential direction and an inner length along the circumferential direction, and wherein the outer length is at least about ten percent greater than the inner length.

In certain exemplary embodiments the electric machine further includes a heat exchanger including a heat exchange surface thermally coupled to the back surface of the yoke the stator assembly.

For example, in certain exemplary embodiments, the heat exchange surface defines an outwardly sloped angle with the radial direction substantially equal to a negation of the inwardly sloped angle of the back surface of the yoke of the stator assembly.

In another exemplary embodiment, an axial flux electric machine defining an axial direction and a radial direction is provided. The electric machine includes a rotor assembly rotatable about the axis, and a stator assembly including a stator face defining an air gap along the axial direction with the rotor assembly. The stator assembly further includes a yoke, the yoke including a back surface, the back surface defining an inwardly sloped angle with the radial direction such that the yoke of the stator assembly defines a substantially consistent magnetic flux density along the radial direction.

In certain exemplary embodiments the inwardly sloped angle is greater than two degrees.

In certain exemplary embodiments the inwardly sloped angle is greater than about three degrees and less than about forty degrees.

In certain exemplary embodiments the stator assembly includes a plurality of stator teeth, wherein each stator tooth defines an outer length along the circumferential direction and an inner length along the circumferential direction, and wherein the outer length is at least about ten percent greater than the inner length.

In certain exemplary embodiments the yoke defines an inner radius along the radial direction and an outer radius along the radial direction, wherein the yoke further defines a first thickness at the inner radius along the axial direction and a second thickness at the outer radius along the axial direction, wherein the second thickness is at least about ten percent greater than the first thickness.

In certain exemplary embodiments the yoke defines an inner radius along the radial direction and an outer radius along the radial direction, wherein the yoke defines a substantially consistent first thickness at the inner radius along the circumferential direction, and wherein the yoke defines a substantially consistent second thickness at the outer radius along the circumferential direction.

In an exemplary aspect of the present disclosure, a method is provided for operating an axial flux electric machine defining an axis, an axial direction, and a radial direction and including a rotor assembly rotatable about the axis and a stator assembly including a yoke. The method includes rotating the rotor assembly about the axis relative to the stator assembly such that the yoke of the stator assembly defines a substantially consistent magnetic flux density along the radial direction, the rotor assembly defining an air gap with the stator assembly along the axial direction.

In certain exemplary aspects rotating the rotor assembly about the axis includes rotating the rotor assembly such that the electric machine generates electrical power.

In certain exemplary aspects rotating the rotor assembly about the axis includes rotating the rotor assembly such that the electric machine converts electric power to an output torque.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "forward" and "aft" refer to the relative positions of a component based on an actual or anticipated direction of travel. For example, "forward" may refer to a front of an aircraft based on an anticipated direction of travel of the aircraft, and "aft" may refer to a back of the aircraft based on an anticipated direction of travel of the aircraft. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
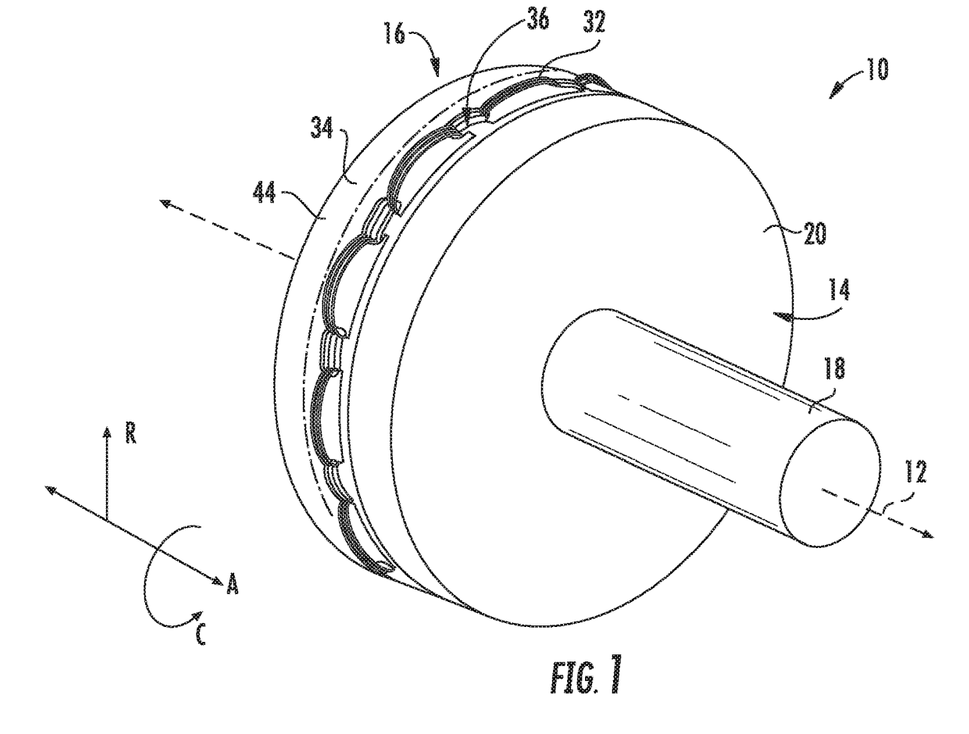
FIG. 1 is a perspective view of an electric machine in accordance with an exemplary embodiment of the present disclosure.

Referring now to the drawings, wherein identical numerals indicate the same elements throughout the FIGS., FIG. 1 provides an electric machine 10 according to an exemplary embodiment of the present subject matter. It should be appreciated that in certain embodiments, the electric machine 10 may be used as a motor or generator for any suitable application or in any suitable device. For example, the electric machine 10 may be used as a power source for propulsor in an aircraft (such as an electric fan in an aircraft), an electric motor or generator integrated into an aeronautical gas turbine engine, a primary or secondary power plant in a land-based vehicle (such as an automobile), a power source for an under-wing mounted propulsion device for an aircraft, a power source for nautical vehicles, etc.

As illustrated, the electric machine 10 defines an axis 12, an axial direction A extending along the axis 12, a radial direction R relative to the axis 12, and a circumferential direction C extending about the axis 12. Further, the electric machine 10 includes a rotor assembly 14 and a stator assembly 16, as well as a drive shaft 18. The drive shaft 18 extends generally along the axial direction A from the rotor assembly 14. The rotor assembly 14 may optionally include a plurality of bearings (not shown) on an axial end of the drive shaft 18. As noted above, in certain exemplary embodiments the electric machine 10 may be configured as electric motor for converting electrical power to torque, and providing such torque through the drive shaft 18 to a power sink (e.g., a fan or propulsor when utilized for aeronautical purposes). According to other exemplary embodiments, however, the electric machine 10 may alternatively be configured as electric generator configured to convert torque provided to the electric machine 10 through the drive shaft 18 to electrical power. Further, in certain embodiments, the electric machine 10 may operate as an electric motor or electric generator depending on, e.g., an operating mode.

As is also depicted in FIG. 1, the rotor assembly 14 includes a rotor disk 20 that is mounted to, and extends from, the drive shaft 18 substantially along the radial direction R. In this regard, the rotor assembly 14, and more specifically, the rotor disk 20, is rotatable about the axis 12 and axial direction A. It will be appreciated that any suitable method of coupling drive shaft 18 to rotor disk 20 may be used to transmit torque. Further, it will be appreciated that in certain embodiments, the drive shaft 18 may include additional features configured to provide passages for a cooling fluid (not shown) within rotor assembly 14. In a non-limiting example, the cooling fluid may be airflow or a coolant.

Figure 2:
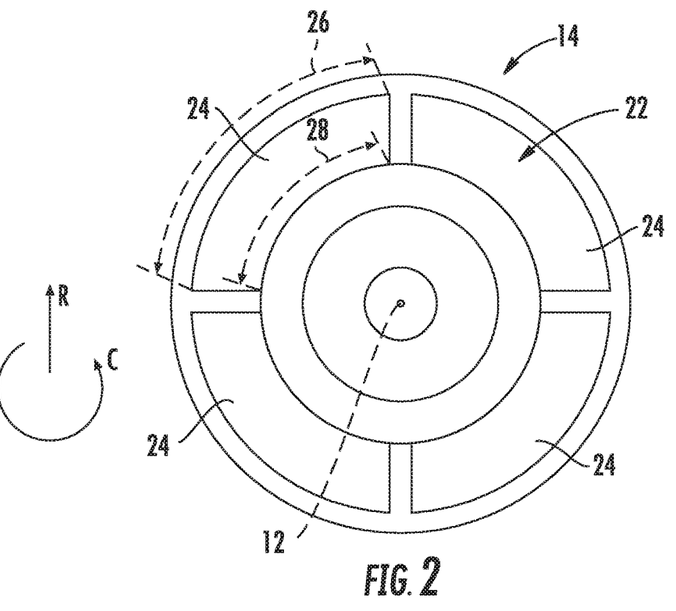
FIG. 2 is a plan view of a rotor assembly of the exemplary electric machine of FIG. 1 in accordance with an exemplary embodiment of the present disclosure.

Referring now also briefly to FIG. 2, providing a plan view of an inside surface 22 of the rotor assembly 14, it will be appreciated that the rotor assembly 14 includes a plurality of rotor magnets 24. The rotor magnets 24 are configured to generate a rotor magnetic field. The plurality of rotor magnets 24 of the rotor assembly 14 are arranged along the circumferential direction C of the electric machine 10. Each of the rotor magnets 24 defines a "wedge" shape. More specifically, each of the rotor magnets 24 defines an outer magnet length 26 along the circumferential direction C and an inner magnet length 28 along the circumferential direction C. For the embodiment shown, the outer and inner edges of each rotor magnet 24 are curved to follow the circumferential direction C of the electric machine 10. Accordingly, for the embodiment depicted, the outer magnet length 26 is an outer circumferential length and the inner magnet length 28 is, similarly, an inner circumferential length. For the embodiment depicted, the outer magnet length 26 of each of the rotor magnets 24 is at least about ten percent greater than the inner magnet length 28 of each of the rotor magnets 24.

Notably, although the rotor assembly 14 is depicted including permanent magnets as its rotor magnets 24, in other exemplary embodiments, the rotor assembly 14 may instead utilize, e.g., electromagnets as its rotor magnets 24.

Figure 3:
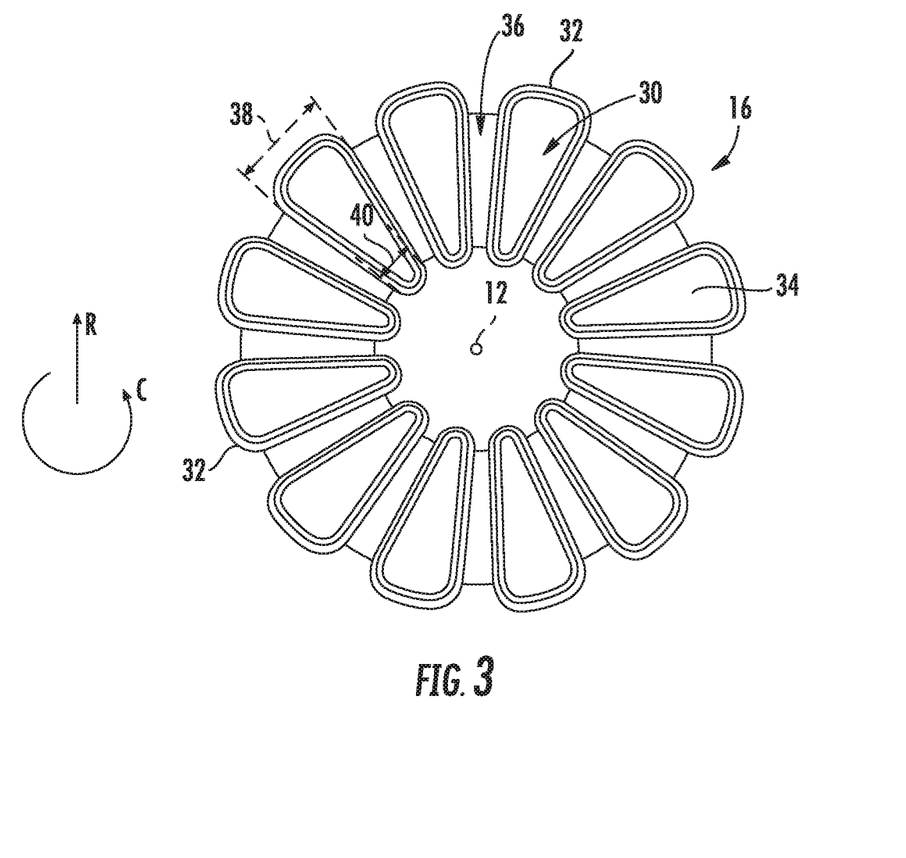
FIG. 3 is a plan view of a stator assembly of the exemplary electric machine of FIG. 1 in accordance with an exemplary embodiment of the present disclosure.
Figure 4:
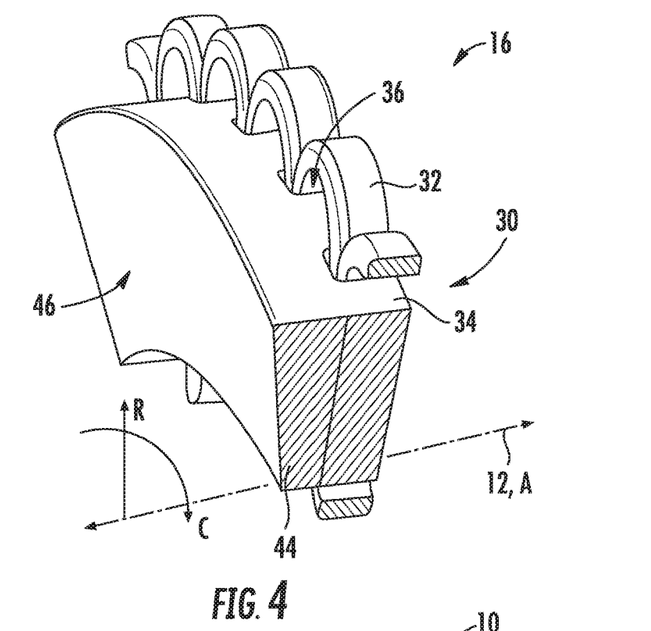
FIG. 4 is a perspective, cross-sectional view of a portion of a stator assembly of the exemplary electric machine of FIG. 3.

Further, referring now also briefly to FIGS. 3 and 4, providing a plan view of a stator face/inside surface 30 of the stator assembly 16, and a perspective view of a portion of the exemplary stator assembly 16, respectively, it will be appreciated that the stator assembly 16 similarly includes a plurality of windings 32 configured to generate a stator magnetic field. More specifically, the stator assembly 16 includes a plurality of stator teeth 34 and stator slots 36. The plurality of stator teeth 34 are arranged along the circumferential direction C of the electric machine 10 and generally define the stator slots 36 therebetween. The plurality of windings 32 are arranged at least partially within the stator slots 36, wrapped around the stator teeth 34. Similar to the magnets 24 of the rotor assembly 14, the stator teeth 34 each define a "wedge" shape. More specifically, each of the stator teeth 34 defines an outer tooth length 38 along the circumferential direction C and an inner tooth length 40 along the circumferential direction C. For the embodiment shown, the outer and inner edges of the stator teeth 34 are each curved to follow the circumferential direction C of the electric machine 10. Accordingly, for the embodiment depicted, the outer tooth length 38 is an outer circumferential length and the inner tooth length 40 is, similarly, an inner circumferential length. For the embodiment depicted, the outer tooth length 38 of each of the stator teeth 34 is at least about 10 percent greater than the inner tooth length 40 of each of the stator teeth 34.

Referring generally to FIGS. 2 through 4, it will be appreciated that the rotor assembly 14 and a stator assembly 16 each define a pole count. For the embodiment depicted, the pole count defined by each of the stator assembly 16 and the rotor assembly 14 is less than or equal to twenty-four (24). More specifically, for the embodiment depicted, the rotor assembly 14 defines a pole count of four (4) and the stator assembly 16 defines a pole count of twelve (12). However, in other embodiments, the rotor assembly 14 and a stator assembly 16 may each define any other suitable pole count. Notably, given the relatively low pole count of the rotor assembly 14 and stator assembly 16, the "wedge" shapes of the rotor magnets 24 and stator teeth 34 are amplified. The higher the pole count of the rotor assembly 14, the less pronounced the wedge shape of the rotor magnets 24 is, and similarly, the higher the pole count of the stator assembly 16, the less pronounced the wedge shape of the stator teeth 34 is.

Figure 5:
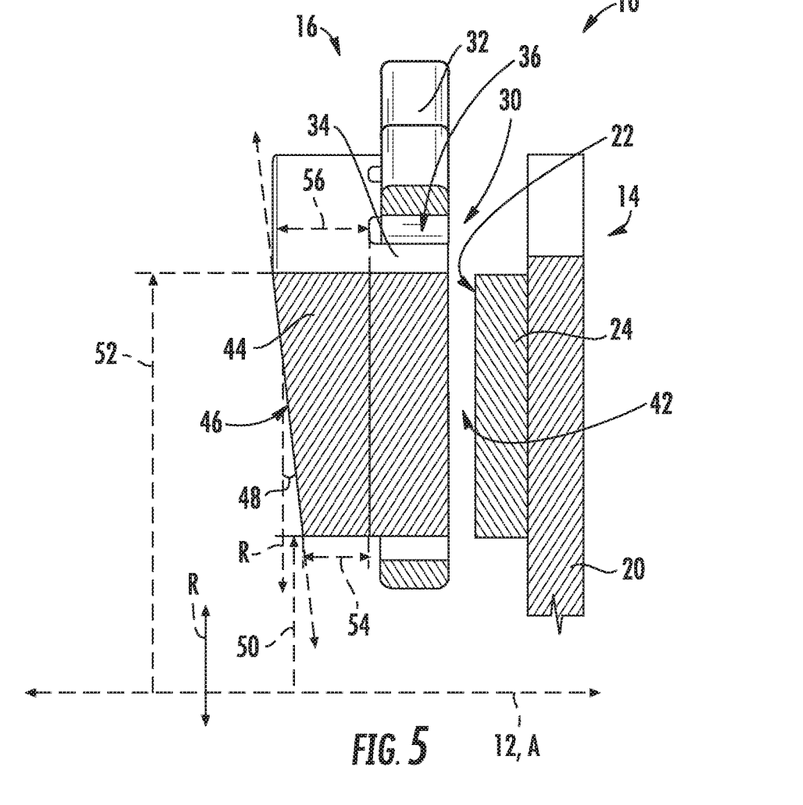
FIG. 5 is a cross-sectional view of a portion of an electric machine in accordance with an exemplary embodiment of the present disclosure.

Referring now particularly to FIG. 5, providing a close-up, cross-sectional view of a portion of the exemplary electric machine 10 of FIG. 1, it will be appreciated that for the embodiment depicted, the rotor disk 20 of the rotor assembly 14 and stator assembly 16 are generally spaced from one another along the axial direction A of the electric machine 10. Further, in such a manner, the rotor magnets 24 may define a magnetization direction (i.e., a north-south pole orientation) that extends along the axial direction A. The electric machine 10 depicted may therefore generally be referred to as an "axial flux" electric machine 10. Further, it will be appreciated that the stator assembly 16 generally defines an air gap 42 along the axial direction A with the rotor assembly 14.

Moreover, it will be appreciated that the stator assembly 16 further includes a yoke 44. The plurality of stator teeth 34 of the stator assembly 16 are attached to, or formed integrally with the stator yoke 44, and the stator yoke 44 extends generally along the circumferential direction C behind each of the plurality of stator teeth 34. Notably, each of the plurality of stator teeth 34 defines a substantially consistent thickness along the axial direction A between a radially inner end and a radially outer end (i.e., an axial thickness of each tooth 34 is the same at the respective radially inner end and respective radially outer end).

Referring still particularly to FIG. 5, it will be appreciated that the yoke 44 includes a back surface 46 (i.e., "back" relative to the stator face 30 and air gap 42 defined between the stator assembly 16 and the rotor assembly 14). The back surface 46 is configured to reduce an amount of eddy current generated within the stator assembly 16 during operation of the electric machine 10. More specifically, the back surface 46 of the yoke 44 of the stator assembly 16 defines an inwardly sloped angle 48 with the radial direction R greater than two (2) degrees. It will be appreciated, that as used herein, the term "inwardly sloped angle" with reference to the back surface 46 of the yoke 44, refers to the back surface 46 of the yoke 44 extending generally towards the air gap 42 as it moves inwardly towards the axis 12 of the electric machine 10 along the radial direction R.

More specifically, for the exemplary embodiment depicted, the inwardly sloped angle 48 is greater than about 2.5 degrees, such as greater than about three (3) degrees, such as greater than about five (5) degrees, such as greater than about ten (10) degrees, such as greater than about fifteen (15) degrees, such as less than about forty-five (45) degrees, such as less than about forty (40) degrees, such as less than about thirty-five (35) degrees, such as less than about thirty (30) degrees.

More specifically, as is depicted in FIG. 5, the yoke 44 generally defines an inner radius 50 along the radial direction R and an outer radius 52 along the radial direction R. Further, the yoke 44 defines a first thickness 54 along the axial direction A at the inner radius 50 and a second thickness 56 along the axial direction A at the outer radius 52. For the embodiment depicted, the second thickness 56 is greater than the first thickness 54. Specifically, for the exemplary embodiment depicted, the second thickness 56 is at least about ten (10) percent greater than the first thickness 54, and up to about two hundred (200) percent greater than the first thickness 54, such as up to about one hundred and fifty (150) percent greater than the first thickness 54, such as up to about one hundred (100) percent greater than the first thickness 54. Further, it will be appreciated that the yoke 44 generally defines a substantially consistent first thickness 54 at the inner radius 50 along the circumferential direction C of the electric machine 10, and similarly, that the yoke 44 generally defines a substantially consistent second thickness 56 at the outer radius 52 along the circumferential direction C of the electric machine 10. It will be appreciated, that as used herein, the term "substantially consistent" with reference to a thickness of the yoke 44 along the circumferential direction C refers to the yoke 44 defining substantially the same thickness a particular radial position substantially three hundred and sixty (360) degrees about the axis 12.

Further, for the embodiment shown, the back surface 46 of the yoke 44 extends in a substantially straight direction from the inner radius 50 (defining the first thickness 54) to the outer radius 52 (defining the second thickness 56). However, in other embodiments, the back surface 46 may have other suitable shapes. Regardless of the shape/extension direction of the back surface 46 of the yoke 44, the inwardly sloped angle 48 may be defined based on the first (inner) thickness 54, the second (outer) thickness 56, the inner radius 50, and the outer radius 52. Specifically, the inwardly sloped angle 48 may be defined by the following equation:

$$\alpha = \tan^{-1}\left(\frac{TO - TI}{RO - RI}\right),$$

wherein α is the inwardly sloped angle 48, $T_O$ is the second (outer) thickness 56, $T_I$ is first (inner) thickness 54, $R_O$ is the outer radius 52, and $R_I$ is the inner radius 50. Notably, it will be appreciated that the first (inner) thickness 54, the second (outer) thickness 56, the inner radius 50, and the outer radius 52 each refer to portions of the yoke 44 that are active magnetic flow path portions of the yoke 44 (i.e., part of the active magnetic circuit of the yoke 44). For the embodiment depicted, an entire portion of the yoke 44 depicted is part of the active magnetic flow path portions of the yoke 44.

Moreover, it will be appreciated that inclusion of a stator yoke 44 having an inwardly sloped angle 48 in accordance with one or more the embodiments described above may result in a stator yoke 44 of the stator assembly 16 defining a substantially consistent magnetic flux density along the radial direction R during operation of the electric machine 10. Such will be explained in more detail below.

More specifically, it will be appreciated that a magnetic flux density through the yoke 44 of the stator assembly 16 at a particular radius is a function of a surface area of the stator tooth 34 at such radius and/or of the rotor magnets 24 at such radius. Accordingly, as the surface area of the stator tooth 34 (and rotor magnets 24) increases along the radial direction R, given the "wedge" shapes of the stator teeth 34 and rotor magnets 24, assuming a constant thickness stator yoke 44, the magnetic flux density through such yoke 44 would also increase along the radial direction R. Such variance in magnetic flux density along the radial direction R may result in circulating currents along the radial direction R (i.e., from higher flux density areas to lower flux density areas), also referred to as eddy currents. Such eddy currents reduce an efficiency of the electric machine 10 and further increase a temperature of the stator assembly 16.

However, by varying a thickness of the stator yoke 44 along the radial direction R, and more specifically, by inwardly sloping the back surface 46 of the stator yoke 44, the stator yoke 44 may maintain a substantially consistent magnetic flux density along the radial direction R during operation of the electric machine 10, minimizing or substantially eliminating the eddy currents along the radial direction R, and increasing efficiency of the electric machine 10.

Figure 6:
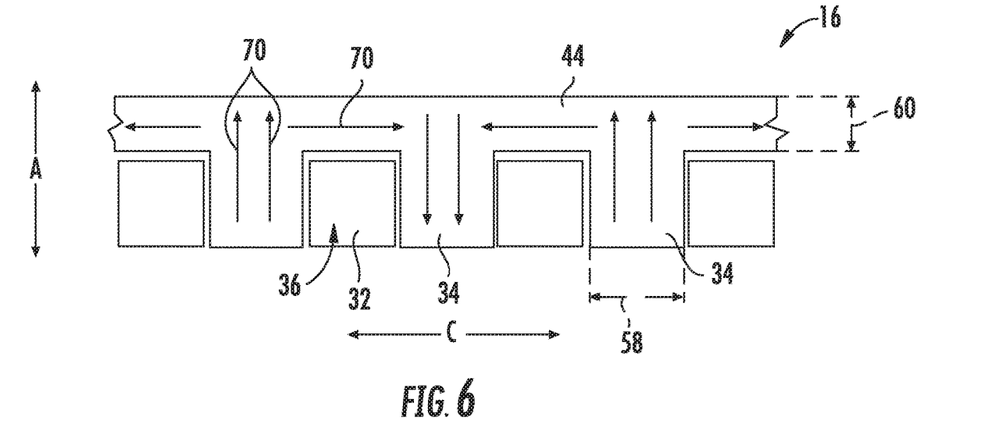
FIG. 6 is a partial, cross-sectional view of the exemplary stator assembly of FIG. 5 at a first radius
Figure 7:
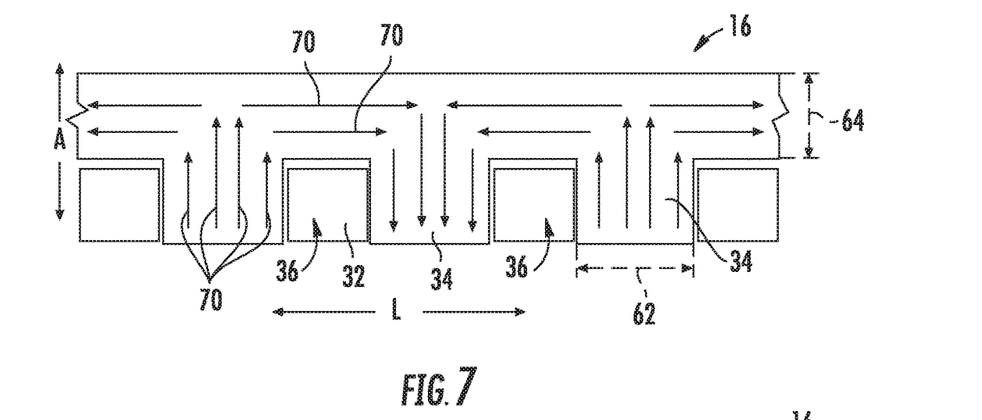
FIG. 7 is a partial, cross-sectional view of the exemplary stator assembly of FIG. 5 at a second radius.
Figure 8:
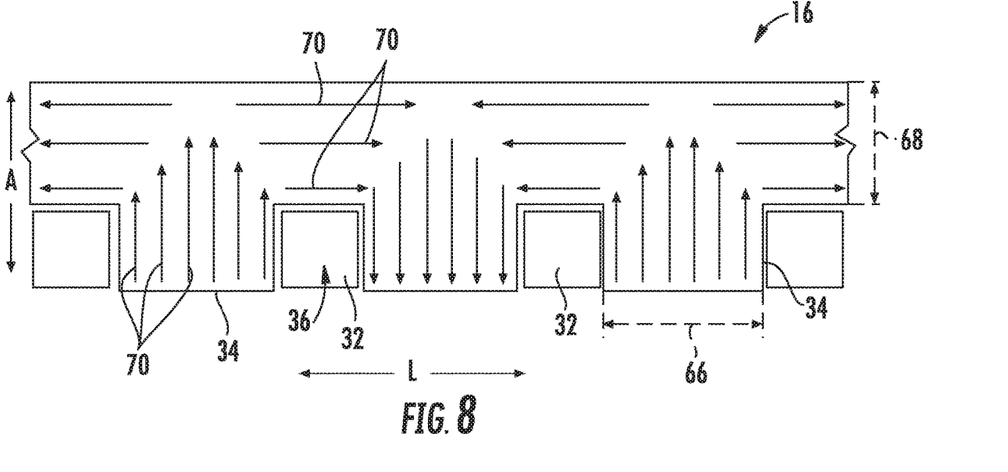
FIG. 8 is a partial, cross-sectional view of the exemplary stator assembly of FIG. 5 at a third radius.

Referring now to FIG. 6 through 8, a stator assembly 16 configured for maintaining a substantially consistent magnetic flux density through its stator yoke 44 along the radial direction R during operation of the electric machine 10 is illustrated. The exemplary stator assembly 16 depicted may be configured in substantially the same manner as the exemplary stator assembly 16 described above with reference to FIGS. 1 through 5. For example, an electric machine 10 including the exemplary stator assembly 16 may generally define a circumferential direction C, an axial direction A, and a radial direction R (not shown). Additionally, the stator assembly 16 generally includes a plurality of stator teeth 34 arranged along the circumferential direction C attached to, or formed integrally with a stator yoke 44. Adjacent stator teeth 34 of the stator assembly 16 define a stator slot 36 therebetween with, for the embodiment depicted, windings 32 positioned at least partially therein.

With reference to FIG. 6, a plan, cross-sectional view of the exemplary stator assembly 16 at a first radius along the radial direction R is provided. The first radius may be an inner radius of the stator assembly 16 (see, e.g., inner radius 50 of FIG. 5). As is shown, the stator teeth 34 define a first length 58 along the circumferential direction C and the stator yoke 44 defines a first thickness 60 along the axial direction A at the first radius. (Notably, the first thickness 60 may be equal to the first thickness 54, depicted in FIG. 5.) Additionally, with reference to FIG. 7, a plan, cross-sectional view of the exemplary stator assembly 16 at a second radius along the radial direction R is provided. The second radius may be approximately halfway between the inner/first radius of FIG. 6 and an outer/third radius (see FIG. 8) of the stator assembly 16 (see also, e.g., outer radius 52 of FIG. 5). As is shown, the stator teeth 34 define a second length 62 along the circumferential direction C and the stator yoke 44 defines a second thickness 64 along the axial direction A at the second radius. Further, with reference to FIG. 8, a plan, cross-sectional view of the exemplary stator assembly 16 at the third radius along the radial direction R is provided. The third radius may be an outer radius of the stator assembly 16 (see, e.g., outer radius 52 of FIG. 5). As is shown, the stator teeth 34 define a third length 66 along the circumferential direction C and the stator yoke 44 defines a third thickness 68 along the axial direction A at the third radius. (Notably, the third thickness 68 may be equal to the second thickness 56 depicted in FIG. 5.)

It will be appreciated that the length of the stator teeth 34 generally increases from the first radius, to the second radius, to the third radius, and similarly, the thickness of the stator yoke 44 correspondingly increases from the first radius, to the second radius, to the third radius. More specifically, the first length 58 is less than the second length 62, which is less than the third length 66, and similarly, the first thickness 60 is less than the second thickness 64, which is less than the third thickness 68. As is depicted schematically, increasing the thickness of the stator yoke 44 with the length of the stator teeth 34 allows for the maintenance of a substantially consistent magnetic flux density, indicated by magnetic flux arrows 70, along the radial direction R of the stator assembly 16 during operation of the electric machine 10. It will be appreciated, that as used herein, the term "substantially constant magnetic flux density along the radial direction" with reference to the yoke 44, refers to a variation in average flux density between any two radial positions of the stator yoke 44 at a given circumferential position being less than about ten percent of the value of an average flux density at a particular radial position (and at the same circumferential position) during operation of the electric machine 10.

As discussed above, inclusion of a stator assembly 16 in accordance with such an exemplary embodiment may result in a more efficient electric machine 10 by minimizing the eddy currents generated therein. Notably, such a benefit comes at the cost of an increased axial length of the stator assembly 16 (i.e., increased thickness of the stator yoke 44 at the radially outer end), which may also result in an increased weight of the stator assembly 16. However, the increased efficiency generated may outweigh these costs.

Further, it will be appreciated that by reducing the formation of eddy currents within the stator assembly 16, an amount of heat generated within the stator assembly 16 may also be reduced. Moreover, by sloping the back surface 46 of the yoke 44, a surface area of the back surface 46 of the yoke 44 is also increased. Such may also allow for more efficient heat transfer from the stator assembly 16.

Figure 9:
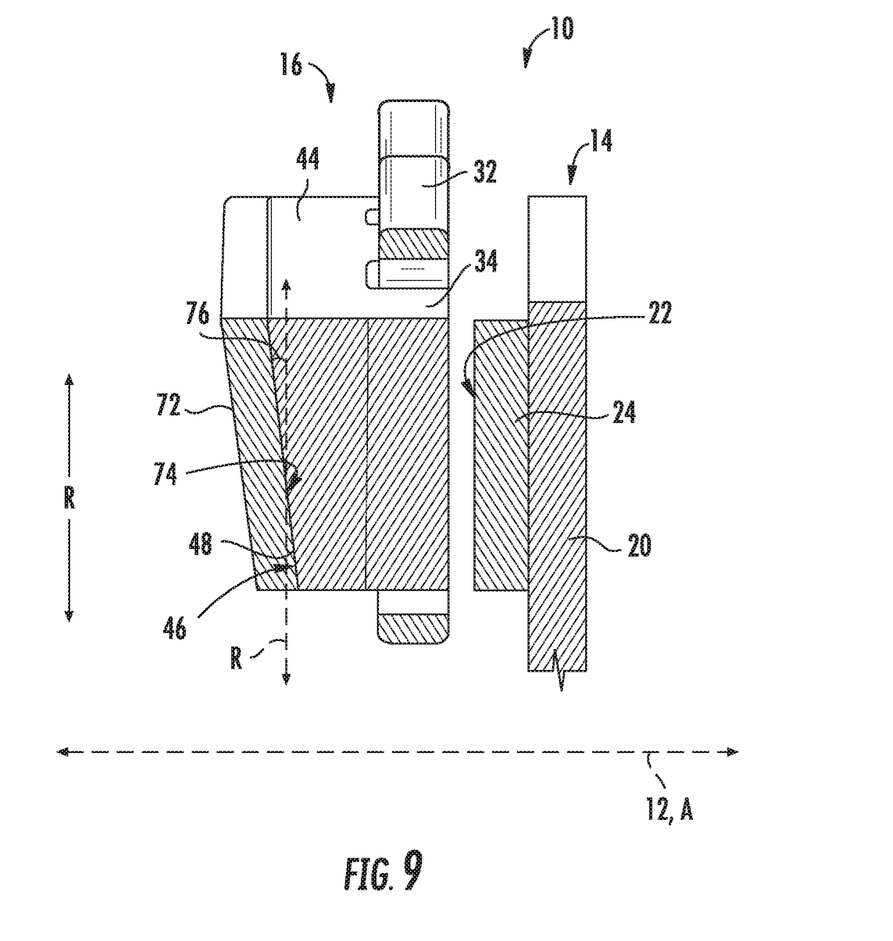
FIG. 9 is a cross-sectional view of a portion of an electric machine in accordance with another exemplary embodiment of the present disclosure.

For example, referring briefly to FIG. 9, providing a side, cross-sectional view of a portion of an electric machine 10 in accordance with another exemplary embodiment present disclosure, it will be appreciated that in certain exemplary embodiments, the electric machine 10 may further include a heat exchanger 72 coupled to the yoke 44 of the stator assembly 16. The exemplary electric machine 10 of FIG. 9 may be configured in substantially the same manner as the exemplary electric machine 10 described above with reference to, e.g., FIG. 5. Accordingly, the electric machine 10 generally includes a stator assembly 16 having a stator yoke 44, with the stator yoke 44 including a back surface 46 defining an inwardly sloped angle 48 with a radial direction R of the electric machine 10.

As stated, the exemplary electric machine 10 of FIG. 9 further includes the heat exchanger 72. The heat exchanger 72 generally includes a heat exchange surface 74 in thermal communication with the back surface 46 of the yoke 44 of the stator assembly 16. More specifically, for the embodiment depicted, the heat exchange surface 74 of the heat exchanger 72 contacts the back surface 46 of the yoke 44 of the stator assembly 16. Moreover, for the embodiment shown, the heat exchange surface 74 defines an outwardly sloped angle 76 with the radial direction R. The outwardly sloped angle 76 of the heat exchange surface 74 is substantially equal to a negation of the inwardly sloped angle 48 of the back surface 46 of the yoke 44 of the stator assembly 16 (i.e., a negative value of). In such a manner, the heat exchanger 72 may more efficiently remove heat from the stator assembly 16 as an increased surface area of the heat exchanger 72 (i.e., the heat exchange surface 74) contacts the back surface 46 of the yoke 44 of the stator assembly 16 to more efficiently remove an amount of heat therefrom. Such may generally result in a smaller, more axially compact heat exchanger 72. It will be appreciated that the heat exchanger 72 may be any suitable form or type of heat exchanger.

Figure 10:
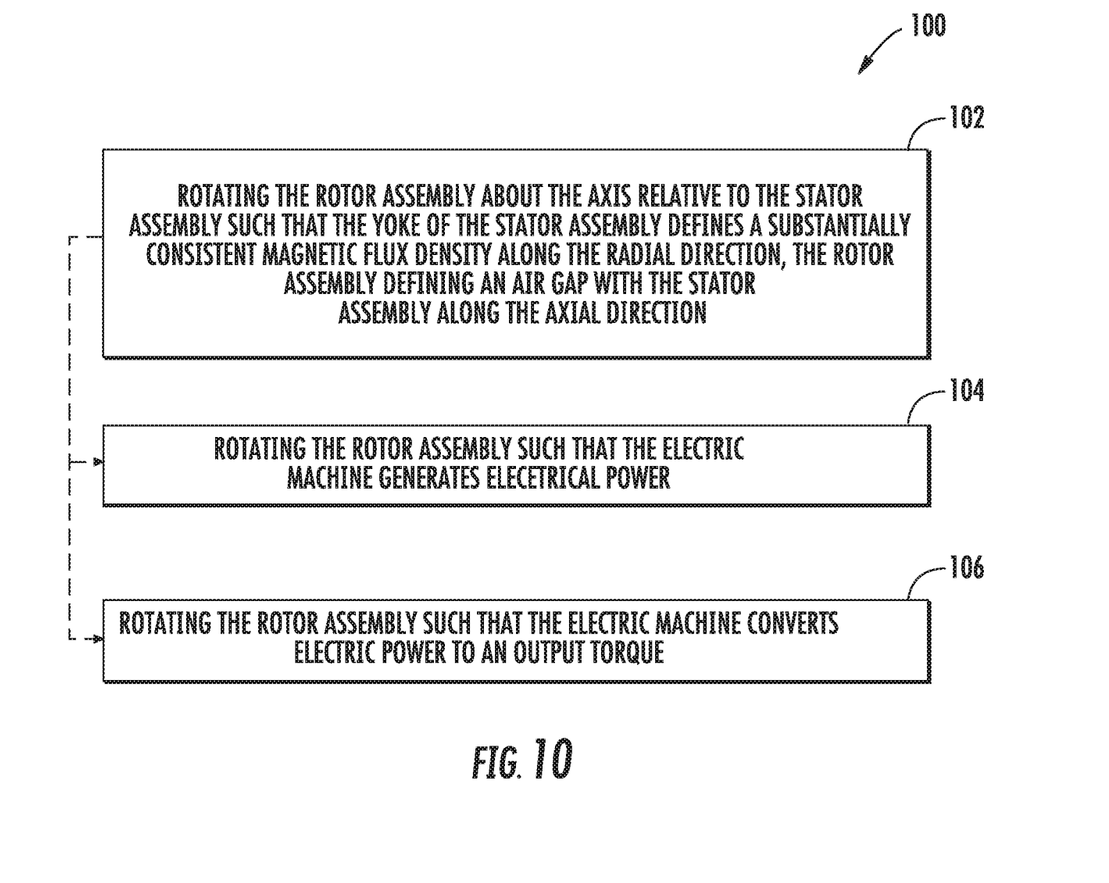
FIG. 10 is a flow diagram of a method for operating an axial flux electric machine in accordance with an exemplary aspect of the present disclosure.

Further, referring now to FIG. 10, a flow diagram of a method 100 for operating an axial flux electric machine in accordance with an exemplary aspect of the present disclosure is provided. The exemplary method 100 of FIG. 10 may be utilized with one or more the exemplary electric machines described above with reference to FIGS. 1 through 9. Accordingly, for example, the electric machine may define an axis, an axial direction, a circumferential direction, and a radial direction. Additionally, the electric machine may include a rotor assembly rotatable about the axis and a stator assembly including a yoke. The electric machine may be an axial flux electric machine.

As is depicted, the method 100 generally includes at (102) rotating the rotor assembly about the axis relative to the stator assembly such that the yoke of the stator assembly defines a substantially consistent magnetic flux density along the radial direction, the rotor assembly defining an air gap with the stator assembly along the axial direction.

In certain exemplary aspects, rotating the rotor assembly of the electric machine at (102) may include at (104) rotating the rotor assembly such that the electric machine generates electrical power. However, in other exemplary aspects, rotating the rotor assembly of the electric machine at (102) alternatively includes at (106) rotating the rotor assembly such that the electric machine converts electric power to an output torque.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An axial flux electric machine defining an axis, an axial direction, a circumferential direction, and a radial direction, the electric machine comprising:
   a rotor assembly rotatable about the axis including at least one magnet; and
   a stator assembly comprising a stator face defining an air gap along the axial direction with the rotor assembly, the stator assembly further comprising a yoke, the yoke comprising a back surface, the back surface defining an inwardly sloped angle with the radial direction greater than two degrees, wherein the yoke defines an inner radius along the radial direction and an outer radius along the radial direction, and wherein the inner radius is substantially equal to a radial distance between the axis and an inner edge of the magnet and the outer radius is substantially equal to a radial distance between the axis and an outer edge of the magnet.

2. The electric machine of claim 1, wherein the inwardly sloped angle is greater than about three degrees and less than about forty degrees.

3. The electric machine of claim 1, wherein the yoke supports a plurality of windings, and wherein the plurality of windings extend both inwardly and outward of the inwardly sloped angle of the back surface and the at least one magnet.

4. The electric machine of claim 1, wherein the yoke further defines a first thickness at the inner radius along the axial direction and a second thickness at the outer radius along the axial direction, wherein the second thickness is at least about ten percent greater than the first thickness.

5. The electric machine of claim 1, wherein the yoke defines an inner radius along the radial direction and an outer radius along the radial direction, wherein the yoke defines a substantially consistent first thickness at the inner radius along the circumferential direction, and wherein the yoke defines a substantially consistent second thickness at the outer radius along the circumferential direction.

6. The electric machine of claim 1, wherein the yoke defines an inner radius along the radial direction and an outer radius along the radial direction, wherein the back surface of the yoke extends in a substantially straight direction from the inner radius to the outer radius.

7. The electric machine of claim 1, wherein the stator assembly and rotor assembly each define a pole count, and wherein the pole count of each of the stator assembly and the rotor assembly is less than or equal to 24.

8. The electric machine of claim 1, wherein the stator assembly comprises a plurality of stator teeth coupled to, or formed integrally with, the yoke, wherein each stator tooth defines an outer length along the circumferential direction and an inner length along the circumferential direction, and wherein the outer length is at least about ten percent greater than the inner length.

9. The electric machine of claim 1, wherein the rotor assembly comprises a plurality of magnets, wherein each magnet defines an outer length along the circumferential direction and an inner length along the circumferential direction, and wherein the outer length is at least about ten percent greater than the inner length.

10. The electric machine of claim 1, further comprising:
a heat exchanger comprising a heat exchange surface thermally coupled to the back surface of the yoke the stator assembly.

11. The electric machine of claim 10, wherein the heat exchange surface defines an outwardly sloped angle with the radial direction substantially equal to a negation of the inwardly sloped angle of the back surface of the yoke of the stator assembly.

12. An axial flux electric machine defining an axial direction and a radial direction, the electric machine comprising:
a rotor assembly rotatable about the axis having at least one magnet; and
a stator assembly comprising a stator face defining an air gap along the axial direction with the rotor assembly, the stator assembly further comprising a yoke, the yoke comprising a back surface, the back surface defining an inwardly sloped angle with the radial direction such that the yoke of the stator assembly defines a substantially consistent magnetic flux density along the radial direction, wherein a radial width of the back surface defining the sloped angle is generally equal to a radial width of the at least one magnet.

13. The electric machine of claim 12, wherein the inwardly sloped angle is greater than two degrees.

14. The electric machine of claim 12, wherein the inwardly sloped angle is greater than about three degrees and less than about forty degrees.

15. The electric machine of claim 12, wherein the stator assembly comprises a plurality of stator teeth, wherein each stator tooth defines an outer length along the circumferential direction and an inner length along the circumferential direction, and wherein the outer length is at least about ten percent greater than the inner length.

16. The electric machine of claim 12, wherein the yoke defines an inner radius along the radial direction and an outer radius along the radial direction, wherein the yoke further defines a first thickness at the inner radius along the axial direction and a second thickness at the outer radius along the axial direction, wherein the second thickness is at least about ten percent greater than the first thickness.

17. The electric machine of claim 12, wherein the yoke defines an inner radius along the radial direction and an outer radius along the radial direction, wherein the yoke defines a substantially consistent first thickness at the inner radius along the circumferential direction, and wherein the yoke defines a substantially consistent second thickness at the outer radius along the circumferential direction.

18. A method for operating an axial flux electric machine defining an axis, an axial direction, and a radial direction and comprising a rotor assembly rotatable about the axis and a stator assembly comprising a yoke, the method comprising:
rotating the rotor assembly about the axis relative to the stator assembly such that the yoke of the stator assembly defines a substantially consistent magnetic flux density along the radial direction, the rotor assembly defining an air gap with the stator assembly along the axial direction,
wherein the rotor assembly includes a plurality of magnets and the stator assembly defines a sloped back surface, and wherein each of the plurality of magnets and the sloped back surface remain between an inner portion and an outer portion of a plurality of windings when rotating the rotor assembly in the radial direction.

19. The method of claim 18, wherein rotating the rotor assembly about the axis includes rotating the rotor assembly such that the electric machine generates electrical power.

20. The method of claim 18, wherein rotating the rotor assembly about the axis includes rotating the rotor assembly such that the electric machine converts electric power to an output torque.

* * * * *